(12) United States Patent
Inoue

(10) Patent No.: US 8,588,599 B2
(45) Date of Patent: Nov. 19, 2013

(54) IMAGING APPARATUS AND FOCUS CONTROL METHOD FOR THE IMAGING APPARATUS

(75) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/902,025

(22) Filed: Oct. 11, 2010

(65) Prior Publication Data

US 2011/0091191 A1 Apr. 21, 2011

(30) Foreign Application Priority Data

Oct. 15, 2009 (JP) ................................. 2009-237930

(51) Int. Cl.
*G03B 3/00* (2006.01)
(52) U.S. Cl.
USPC ............................................ 396/104; 348/354
(58) Field of Classification Search
USPC ........................... 396/104, 131, 137; 348/354
See application file for complete search history.

(56) References Cited

U.S. PATENT DOCUMENTS

| | | | |
|---|---|---|---|
| 6,941,068 B2 | 9/2005 | Matsuda | |
| 7,154,074 B2* | 12/2006 | Mogamiya et al. | 250/201.2 |
| 8,035,726 B2* | 10/2011 | Matsumoto et al. | 348/356 |
| 2003/0189662 A1 | 10/2003 | Matsuda | |
| 2006/0238641 A1* | 10/2006 | Konishi | 348/349 |
| 2007/0025716 A1* | 2/2007 | Ichimiya | 396/147 |
| 2008/0043287 A1* | 2/2008 | Shinohara et al. | 358/1.16 |
| 2010/0209092 A1* | 8/2010 | Cheng et al. | 396/104 |
| 2011/0069214 A1* | 3/2011 | Nakano | 348/333.01 |
| 2011/0096171 A1* | 4/2011 | Kimura | 348/187 |
| 2012/0092545 A1* | 4/2012 | Sugawara | 348/345 |

FOREIGN PATENT DOCUMENTS

| | | |
|---|---|---|
| CN | 1848914 A | 10/2006 |
| CN | 101350888 A | 1/2009 |
| EP | 1351086 A2 | 10/2003 |
| EP | 1351086 A3 | 11/2003 |
| EP | 1351086 B1 | 7/2005 |
| JP | 2003-295047 A | 10/2003 |

* cited by examiner

*Primary Examiner* — WB Perkey
*Assistant Examiner* — Linda B Smith
(74) *Attorney, Agent, or Firm* — Canon U.S.A., Inc. IP Division

(57) ABSTRACT

An imaging apparatus which includes a focus detection unit performing focus detection in a contrast system, and a display unit displaying the image obtained from an imaging unit in live view display is provided. The imaging apparatus includes a setting member setting a contrast AF calibration mode, a calibration amount obtaining unit for obtaining a difference amount between a focus position selected by a photographer and an in-focus position by the focus detection unit as a contrast AF calibration amount when the focus position is selected by the photographer in the contrast AF calibration mode, a storage unit storing the contrast AF calibration amount, and a focus control unit performing in-focus control by adding the contrast AF calibration amount to the in-focus position by the focus detection unit at the time of shooting while performing the in-focus control based on a result of the focus detection by the focus detection unit.

6 Claims, 4 Drawing Sheets

IMAGING APPARATUS AND FOCUS CONTROL METHOD FOR THE IMAGING APPARATUS

BACKGROUND OF THE INVENTION

1. Field of the Invention

The present invention relates to an imaging apparatus capable of performing focus detection by a contrast system and a focus control method for the imaging apparatus.

2. Description of the Related Art

In recent digital cameras, some digital cameras have been provided with a focus detection device using contrast detection system. The focus detection device detects a focusing state of an object image based on a difference (contrast) in high frequency components contained in an imaging signal acquired by an image sensor. In the contrast detection system, the high frequency components are extracted from a video signal generated based on the signal from the image sensor. The level of the high frequency components is observed in predetermined sampling intervals. Then, a focus adjustment lens is driven in a direction the level of the high frequency components approaches a peak. Hereinafter, the system is referred to as a contrast automatic focus (AF) system. According to the system, when the level of the high frequency components reaches a predetermined peak range, it can be finally determined that the camera is in an in-focus state.

In the contrast AF system, the in-focus determination is performed using the video signal obtained based on the output signal from the image sensor that captures the image of the object. Accordingly, it is possible to obtain the highly accurate in-focus state as to the object.

Japanese Patent Application Laid-Open No. 2003-295047 proposes a lens-exchangeable imaging apparatus that can perform more high-speed and accurate focus control.

However, the position (in-focus position) at the peak obtained according to the contrast AF system does not always correspond to a focal plane intended by the photographer. For example, when an eye that has a contrast is shot, the photographer may want to focus on eyelashes. In such a case, when the contrast AF system is performed, the eye that has high contrast is detected. Accordingly, it is not possible to set the focal plane to the eyelashes. To solve the problem, after the AF operation, the photographer has to operate an operation member of the lens so that the lens is set to the desired focal plane.

SUMMARY OF THE INVENTION

The present invention is directed to provide an imaging apparatus that can focus on a focus position intended by a photographer and a focus control method for the imaging apparatus.

According to an aspect of the present invention, an imaging apparatus which includes an imaging unit photoelectrically converting an image of an object, a focus detection unit performing focus detection in a contrast system based on high frequency components in an image signal obtained from the imaging unit, and a display unit displaying the image obtained from the imaging unit in live view display comprises a setting member setting a contrast AF calibration mode, a calibration amount obtaining unit for obtaining a difference amount between a focus position selected by a photographer and an in-focus position by the focus detection unit as a contrast AF calibration amount when the focus position is selected by the photographer in the contrast AF calibration mode, a storage unit storing the contrast AF calibration amount, and a focus control unit performing in-focus control by adding the contrast AF calibration amount to the in-focus position obtained by the focus detection unit at the time of shooting while performing the in-focus control based on a result of the focus detection by the focus detection unit.

According to the present invention, in-focus state of a photographer's desired focus position can be obtained.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First and second exemplary embodiments of the present invention are described below.

Figure 1:
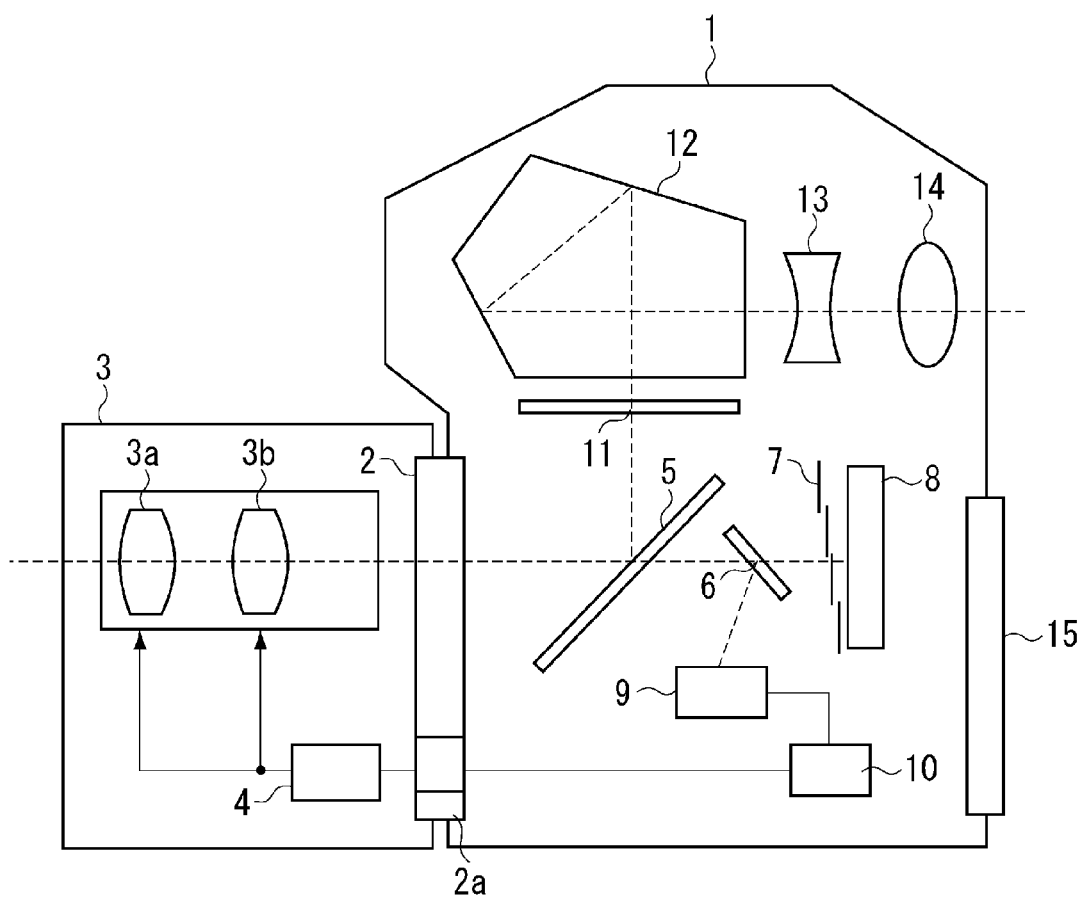
FIG. 1 illustrates a schematic view of a digital single lens reflex camera according to exemplary embodiments of the present invention.

FIG. 1 is a cross sectional view illustrating a schematic configuration of a digital single-lens reflex camera (imaging apparatus) according to the first exemplary embodiment of the present invention. In FIG. 1, reference numeral 1 denotes a camera body. A mount 2 is used to enable attachment or detachment of a shooting lens 3 (described below) to/from the camera body 1. The mount 2 has a mount contact 2a for sending and receiving various signals or supplying a driving power. The shooting lens 3 is exchangeable, and within the lens 3, a focus lens group 3a and a zoom lens group 3b are provided. By moving all or a part of the lens groups 3a and 3b, a focal length can be changed or focus adjustment can be performed. The position of the focus lens group 3a can be adjusted by a photographer operating a focus ring (not shown) that is a focus position adjustment member. A lens control unit 4 performs overall control of the shooting lens 3. The lens control unit 4 includes a central processing unit (CPU).

A main mirror 5 is obliquely provided to a shooting optical path at the time of observation. The main mirror 5 folds light flux from the shooting lens 3 to guide the light flux to a finder optical system (described below). In carrying out exposure, the main mirror 5 is retracted from the shooting optical path and guides the light flux from the shooting lens 3 to an image sensor (described below) 8. A sub mirror 6 consists of a half mirror that moves in conjunction with the main mirror 5. The sub mirror 6 folds the light flux passed through the main mirror 5 and guides the light flux to a focus detection device (described below) 9. Reference numeral 7 denotes a shutter. The image sensor 8 can be a charge coupled device (CCD), a complementary metal-oxide semiconductor (CMOS), or the like that photoelectrically converts an image of an object formed by the shooting lens 3 to obtain an object image.

The focus detection device 9 can detect a focal point by a known phase difference system. The focus detection device 9 includes an area sensor (not shown), and the like. A camera control unit 10 performs overall control of the camera body 1. The camera control unit 10 includes a phase-difference in-focus determination unit that performs the focus detection by the phase difference system using an output signal from the focus detection device 9, and determines whether the shooting lens 3 is within an in-focus range or not. The camera control unit 10 further includes a contrast in-focus determination unit that performs contrast detection of a captured image using the output signal from the image sensor 8, and determines whether the shooting lens 3 is at an in-focus position or not.

A focus plate 11 is provided on a primary image forming plane of the shooting lens 3. On an incidence plane of the focus plate 11, a Fresnel lens (collective lens) is provided. On an exit plane, an object image (finder image) is formed. A pentagonal prism 12 is used to change a finder optical path, and corrects the object image formed on the exit plane of the focus plate 11 as an erected image. Reference numerals 13 and 14 denote eyepiece lenses. An optical system consists of the focus plane 11, the pentagonal prism 12, and the eyepiece lenses 13 and 14 form the finder optical system. A liquid crystal monitor 15 displays a captured image and the like.

Figure 2:
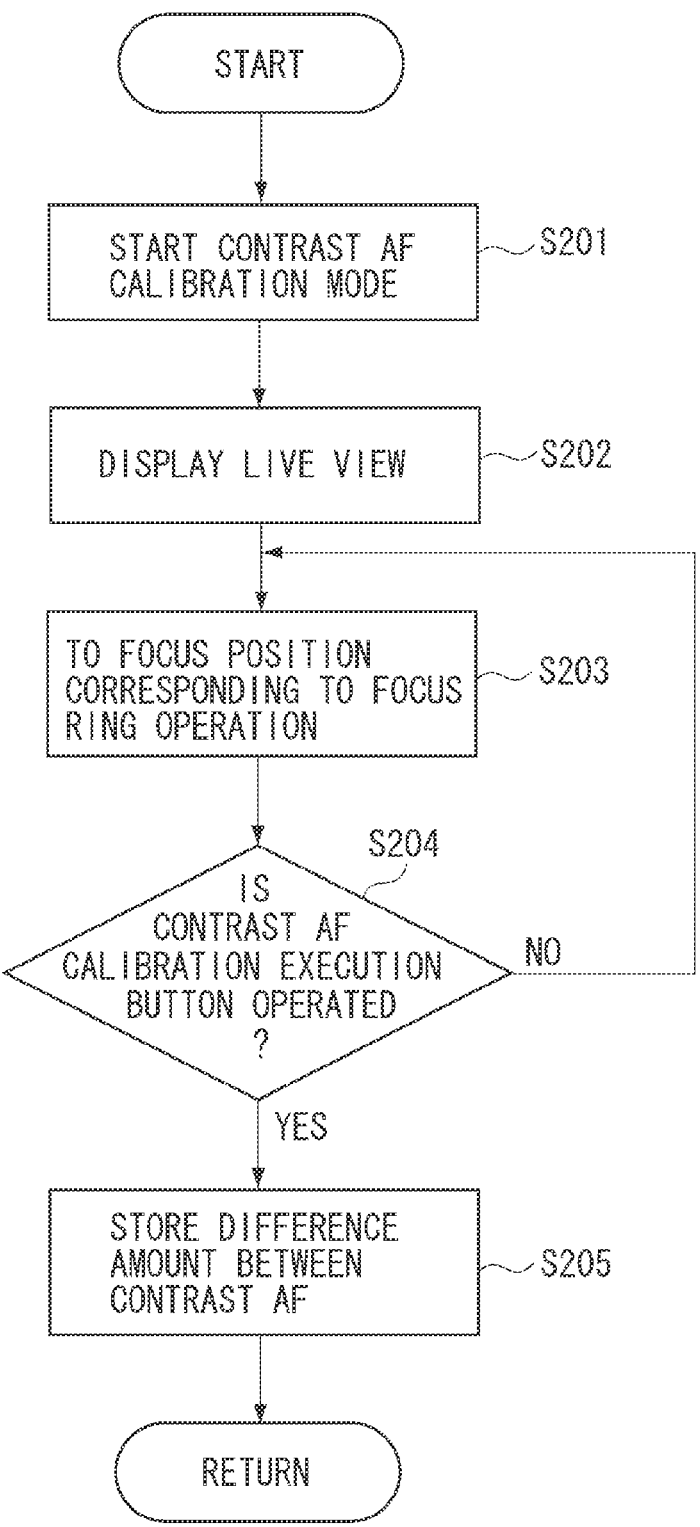
FIG. 2 is a flowchart illustrating operation according to a first exemplary embodiment of the present invention.

Now, operation in a contrast AF calibration mode according to the first exemplary embodiment of the present invention is described with reference to the flowchart in FIG. 2. In the contrast AF calibration mode, a contrast AF calibration amount for correcting a peak position of a contrast obtained in the contrast AF system (contrast system) is obtained.

When a photographer operates a contrast AF calibration mode setting button (not shown), in step S201, the camera control unit 10 starts the contrast AF calibration mode. In step S202, the camera control unit 10 retracts the main mirror 5 from the shooting optical path to open the shutter 7. Then, light flux from the shooting lens 3 is guided to the image sensor 8, and a shot image is obtained. Then, the camera control unit 10 displays the shot image on the liquid crystal monitor 15. More specifically, a live view display for displaying an actual image on the liquid crystal monitor 15 is performed.

In step S203, while confirming the actual image through the liquid crystal monitor 15, the photographer performs focus ring operation of the shooting lens 3. According to the operation, the position of the focal plane is moved to a desired position at the time of the shooting. Such a focus ring operation is performed, for example, in a case where the photographer wants to set the focal plane to the eyelashes although the eye goes into the in-focus state according to the contrast AF operation. In step S204, the camera control unit 10 determines that the photographer's operation of the focal plane to the desired position is completed, and determines whether a contrast AF calibration execution button (not shown) is operated or not. In step S204, if it is determined that the contrast AF calibration execution button is not yet operated, the processing returns to step S203. Then, similar operation is repeated until the contrast AF calibration execution button is operated.

In step S204, if it is determined that the contrast AF calibration execution button is operated, the processing proceeds to step S205. In step S205, the camera control unit 10 calculates a difference amount between the result (focal plane position) of the contrast AF and the focal plane position set according to the photographer's operation. Then, the camera control unit 10 stores the difference amount as a contrast AF calibration amount in a storage unit (not shown) in the camera control unit 10. The difference amount can be a difference of a control amount of the lens, an amount of contrast values of the contrast AF, or the like.

After the above operation, the contrast AF calibration mode ends, and the processing returns to the main routine. Then, the contrast AF calibration amount stored in the storage unit (not shown) is added to a contrast AF result performed in an actual shooting, and AF control is performed. In response to the operation, drive of the shooting lens 3 is controlled such that the focal plane is set to the photographer's desired position.

Figure 3:
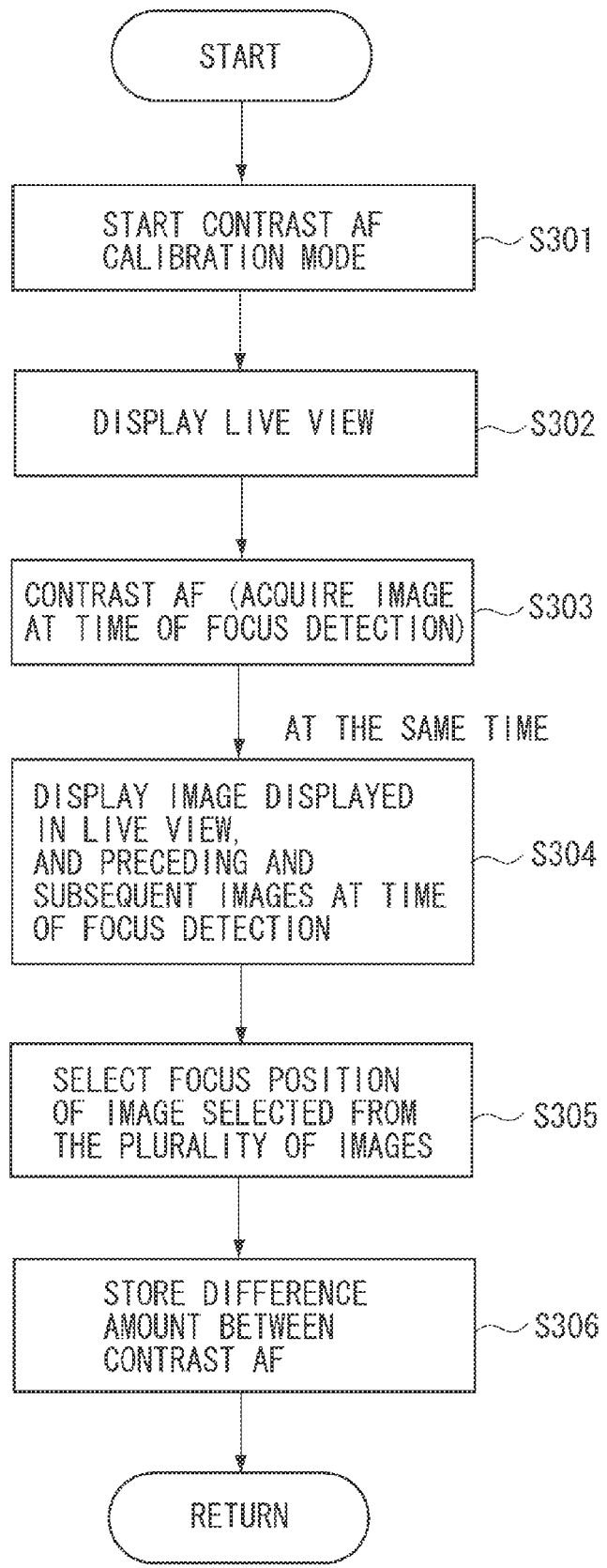
FIG. 3 is a flowchart illustrating operation according to a second exemplary embodiment of the present invention.

Now, operation in a contrast AF calibration mode according to the second exemplary embodiment of the present invention is described with reference to the flowchart in FIG. 3. The configuration of the digital single lens reflex camera is similar to that in FIG. 1. Accordingly, description of the digital single lens reflex camera is omitted.

When the photographer operates the contrast AF calibration mode setting button (not shown), in step S301, the camera control unit 10 starts the contrast AF calibration mode. In step S302, the camera control unit 10 retracts the main mirror 5 from the shooting optical path to open the shutter 7. Then, light flux from the shooting lens 3 is guided to the image sensor 8, and a shot image is obtained. Then, the camera control unit 10 displays the shot image on the liquid crystal monitor 15. More specifically, a live view display for displaying an actual image on the liquid crystal monitor 15 is performed.

Figure 4:
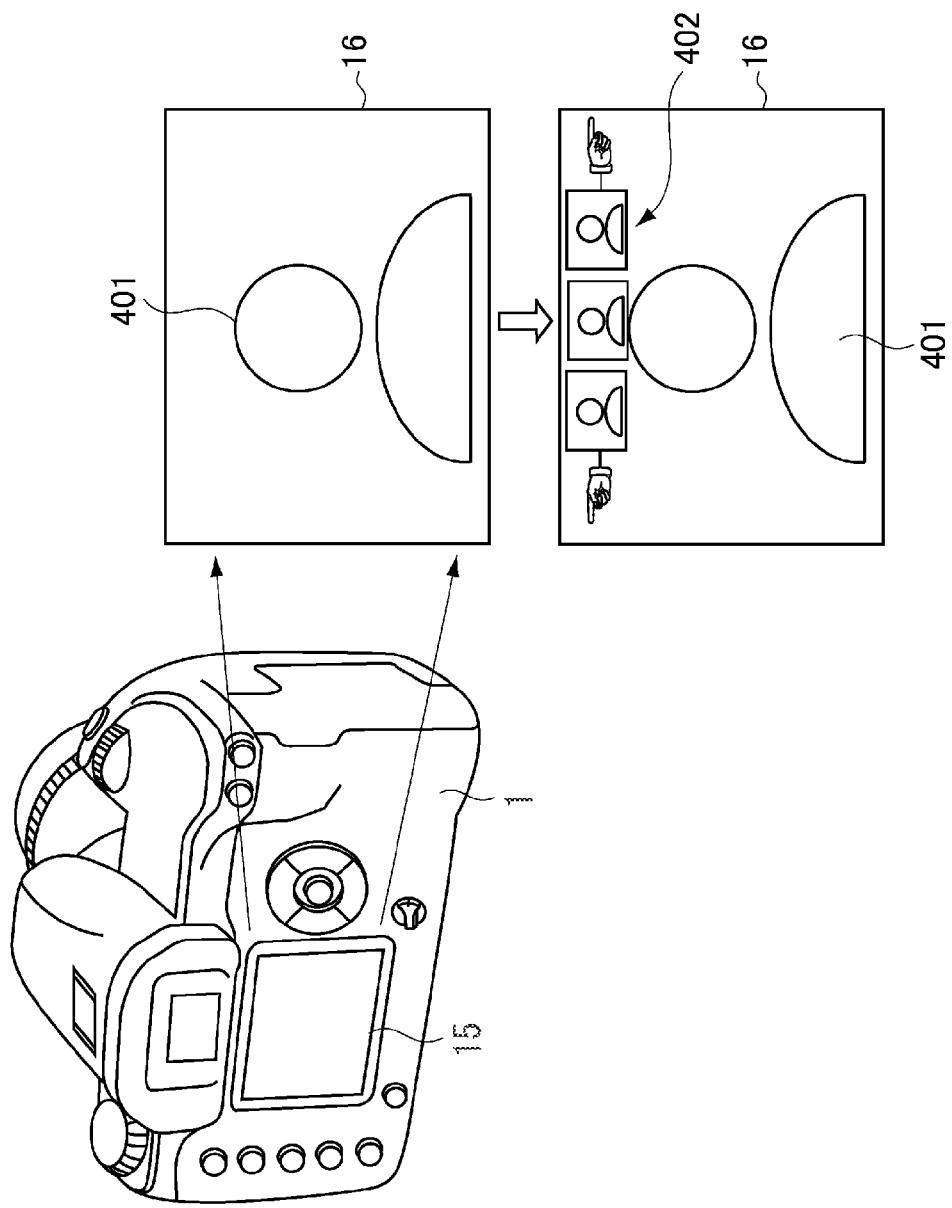
FIG. 4 illustrates an exemplary example of display in operation according to a second exemplary embodiment of the present invention.

In step S303, the contrast AF is carried out and at the same time, an image obtained by the focus detection is stored. In the contrast AF, in order to detect a peak of the contrast, focus detection is surely performed before and after the peak. In the contrast AF, the focus detection is performed before and after the peak in predetermined intervals. In step S304, in addition to the image being displayed in live view in step S302, the images around the peak in the contrast AF obtained in step S303 are displayed. For example, as illustrated in FIG. 4, to an image 401 being displayed in live view, images 402 around the peak in the contrast AF are also displayed on the liquid crystal monitor 15 so that anteroposterior relationship with respect to the focal plane can be intuitively understood.

In step S305, from among the actual image 401 that shows the result of the contrast AF and a plurality of images 402 before and after the peak in the focus detection, which are being displayed on a display plane 16 of the liquid crystal monitor 15, the photographer selects an image showing a desired focal plane using an image selection member (not shown). Accordingly, the focus position (focal plane position) of the selected image is determined as the desired focal plane position. In step S306, a difference amount between the result (focal plane position) of the contrast AF and the focal plane position of the image selected by the photographer is calculated. Then, the camera control unit 10 stores the difference amount as a contrast AF calibration amount in a storage unit (not shown) in the camera control unit 10.

After the above operation, the contrast AF calibration mode ends, and the processing returns to the main routine. Then, the contrast AF calibration amount stored in the storage unit (not shown) is added to a contrast AF result performed in an actual shooting, and AF control is performed. In response to the operation, drive of the shooting lens 3 is controlled so that the focal plane is set as the photographer's desired position.

The digital single lens reflex camera (imaging apparatus) according to the first and second exemplary embodiments includes the following components. The imaging apparatus includes the imaging unit (image sensor 8) that photoelectrically converts an image of an object and the focus detection unit (camera control unit 10) that performs the focus detection in the contrast system based on high frequency components in an image signal from the imaging unit. The imaging apparatus further includes the display unit (liquid crystal monitor 15) that can display the image obtained from the imaging unit in live view display and the setting member (contrast AF calibration mode setting button (not shown)) that sets the contrast AF calibration mode. The imaging apparatus further includes the calibration amount acquisition unit (camera control unit 10) that calculates a difference amount between a photographer's desired focus position and an in-focus position by the focus detection unit when the desired focus position is selected by the photographer in the calibration mode. The calibration amount acquisition unit includes the storage unit (camera control unit 10) that stores the difference amount as a contrast AF calibration amount. The imaging apparatus further includes the focus control unit (camera control unit 10) that adds the contrast AF calibration amount to the in-focus position obtained by the focus detection unit and performs the in-focus control at the time of shooting while carrying out the in-focus control based on the result of the focus detection by the focus detection unit.

The desired focus position selected by the photographer is a desired focus position selected by the operation of the focus position adjustment member. Alternatively, the desired focus position selected by the photographer can be a focus position of an image selected from a plurality of images before and after a peak of contrast displayed on the display unit.

As described above, according to the first and second exemplary embodiments, in-focus state of a photographer's desired focus position can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-237930 filed Oct. 15, 2009, which is hereby incorporated by reference herein in its entirety.

What is claimed is:

1. An apparatus comprising:
   an imaging unit configured to convert an image of an object;
   a detection unit configured to perform focus detection in a contrast system based on high frequency components in an image signal obtained from the imaging unit;
   a display unit configured to display the image in live view display;
   a setting member configured to set a contrast AF calibration mode;
   an obtaining unit configured to obtain a difference amount between a focus position selected by a photographer and an in-focus position by the focus detection unit as a contrast AF calibration amount when the focus position is selected in the contrast AF calibration mode;
   a storage unit configured to store the contrast AF calibration amount; and
   a control unit configured to perform in-focus control by adding the contrast AF calibration amount to the in-focus position at a time of shooting,
   wherein, in the contrast AF calibration mode, the display unit displays first image and second image, wherein the first image is the image related to the in-focus position by the focus detection unit, and the second image is the image related to the focus position surroundings the in-focus position by the focus detection unit.

2. The imaging apparatus according to claim 1, wherein the focus position selected by the photographer is a focus position selected by operation of a focus position adjustment member.

3. The imaging apparatus according to claim 1, wherein the focus position selected by the photographer is a focus position of an image selected from a plurality of images before and after the peak of the contrast displayed on the display unit.

4. A focus control method of an imaging apparatus which comprises a display to display the image in live view display, the focus control method comprising:
   setting a contrast AF calibration mode;
   performing focus detection in a contrast system based on high frequency components in an image signal obtained from an imaging unit converting an image of an object;
   obtaining a difference amount between a focus position and an in-focus position as a contrast AF calibration amount when the focus position is selected in the contrast AF calibration mode;
   storing the contrast AF calibration amount; and
   performing in-focus control by adding the contrast AF calibration amount to the in-focus position obtained by the focus detection at the time of shooting,
   wherein, in the contrast AF calibration mode, the display unit displays first image and second image, wherein the first image is the image related to the in-focus position, and the second image is the image related to the focus position surroundings the in-focus position.

5. The method according to claim 4, wherein the focus position selected by the photographer is a focus position selected by operation of a focus position adjustment member.

6. The method according to claim 4, wherein the focus position is a focus position of an image selected from a plurality of images before and after the peak of the contrast displayed on the display unit.

* * * * *